Jan. 18, 1955 W. SCHRAUB 2,699,694
HORIZONTAL BORING MACHINE WITH CLAMPING MECHANISM
Filed Feb. 16, 1954 2 Sheets-Sheet 1
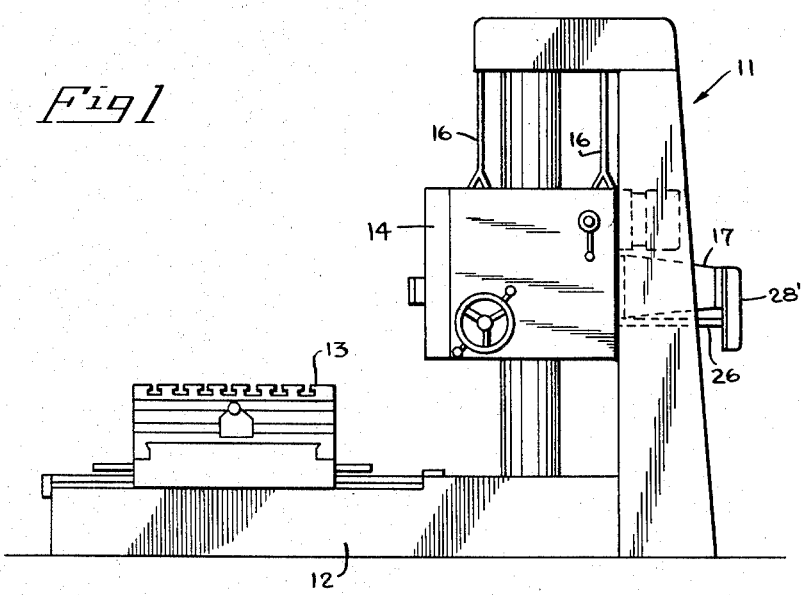
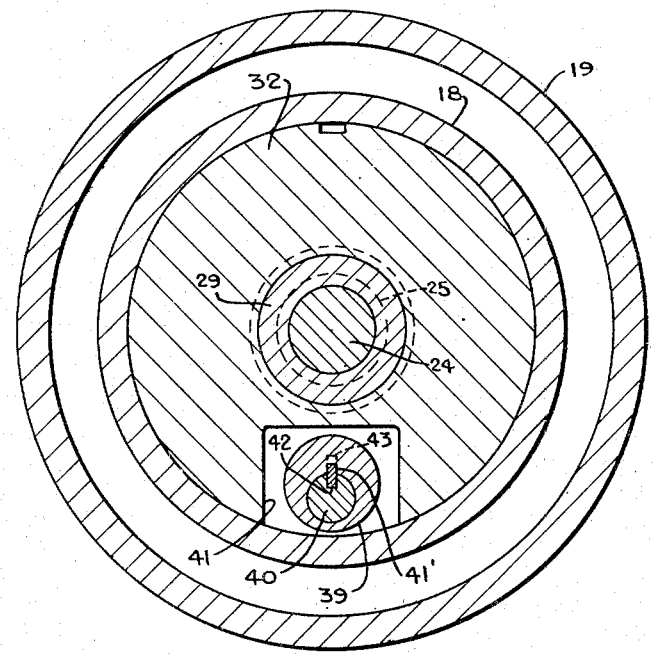
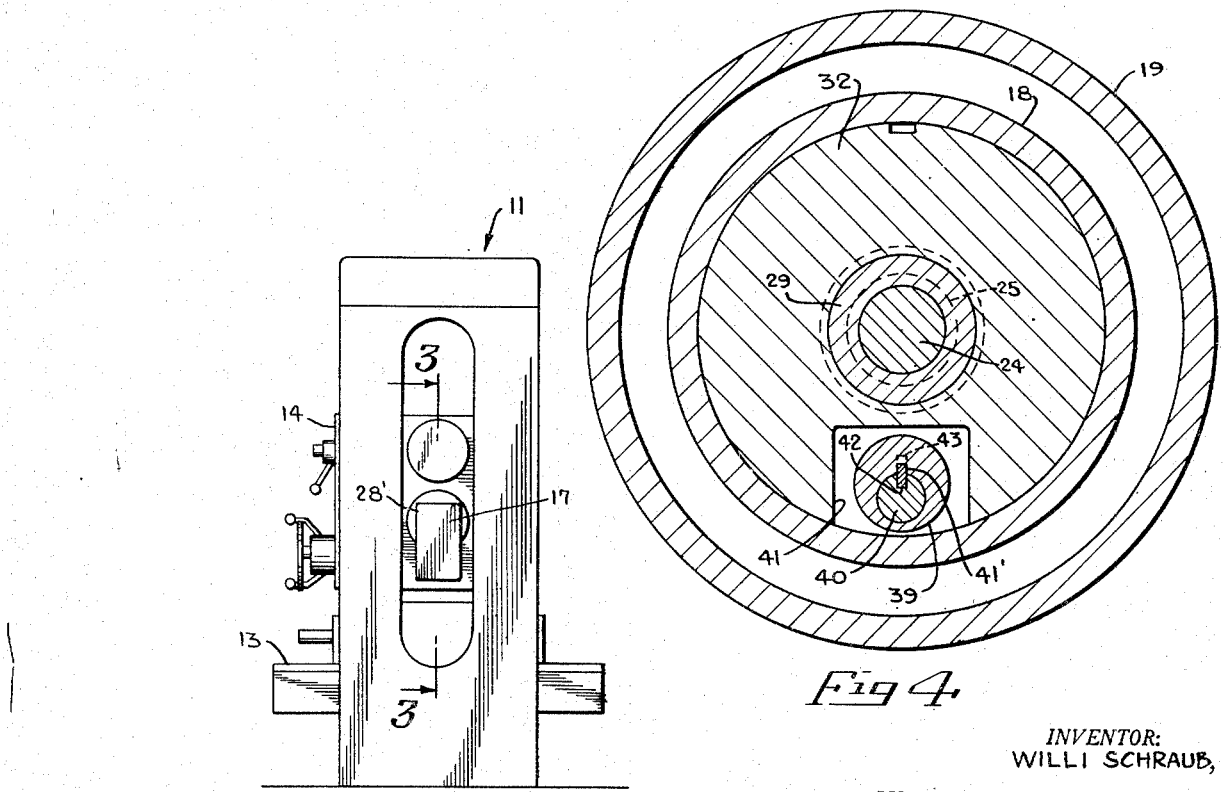
INVENTOR:
WILLI SCHRAUB,
BY
HIS AGENTS.

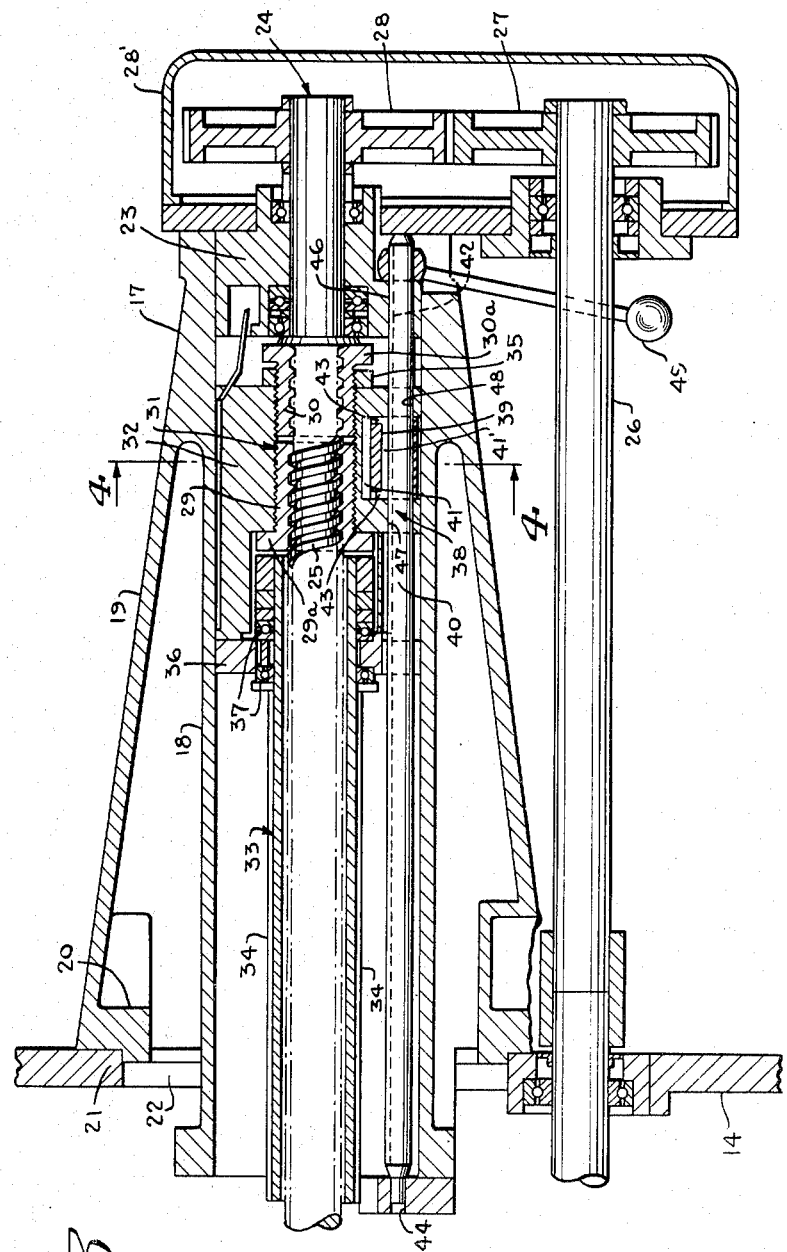

2,699,694

HORIZONTAL BORING MACHINE WITH CLAMPING MECHANISM

Willi Schraub, Wickrath (Niers), Germany, assignor to Scharmann & Co., G. m. b. H., a limited-liability company Application February 16, 1954, Serial No. 410,476

Claims priority, application Germany February 25, 1953

4 Claims. (Cl. 77—3)

The invention relates to horizontal boring machines, and relates more particularly to horizontal boring machines of the type in which the nut body of the bore spindle may releasably be immobilized against axial displacement by means of a clamp.

Machines of this type are customarily designed with a console that projects from the frame of the machine. Heretofore such machines were provided with a nut that was axially guided in the console and rotatably connected to the bore spindle and comprised a bolt that carried a handle which extended to the exterior through a slot in the console and provided for tightening and untightening for immobilizing and respectively releasing of the nut and bore spindle. Constructions of this type have the disadvantage that the slot in the console provides an opening for the entry of dust and other abrasive substances that in the long run are liable to damage the parts of the machine.

It is accordingly among the principal objects of the invention to provide for such a machine that is free from the drawbacks of the prior art, and operates efficiently over long periods of time.

Further objects and advantages of the invention will be set forth in part in the following specification and in part will be obvious therefrom without being referred to, the same being realized and attained as pointed out in the claims hereof.

For a fuller understanding of the nature and objects of the invention, reference should be had to the following detailed description, taken in connection with the accompanying drawings, in which:

Fig. 1 is a side elevational view of a horizontal boring machine having a clamp in accordance with the invention;

Fig. 2 is a rear elevational view of the machine shown in Fig. 1;

Fig. 3 is a large scale fragmentary sectional view taken on line 3—3 of Fig. 2; and Fig. 4 is a large scale sectional view taken on line 4—4 of Fig. 3.

In carrying the invention into effect in one of the embodiments which has been selected for illustration in the accompanying drawings and for description in this specification, and referring now particularly to Figs. 1 and 2, there is provided a boring machine generally indicated at 11 which comprises a bed 12, a worktable 13, and a vertically movable spindle head 14. The spindle head 14 may have counterbalancing means 16 (not shown in detail), and includes a console or bracket 17 in which there are journalled the bore spindle parts as well as the clamping mechanism therefor.

As best shown in Fig. 3, the console 17 comprises a hollow main tube 18 that has a conical outer support 19, and the latter is attached to the spindle head 14; for instance, it may be so attached by means of a flange 20 that may removably be connected to an edge 21 which surrounds an opening 22 in the wall of the spindle head 14. The tube 18 projects for a portion through that opening 22.

A bearing 23 is secured near the outer end on the interior of the tube 18 and journals one end of a threaded spindle generally indicated at 24. The threaded spindle 24 carries a thread 25. The spindle 24 is driven by means of a driving mechanism that includes a feeding shaft 26 that projects from the interior of the head 14 and carries a pinion 27 that meshes with a gear 28 which is keyed to the outer end of threaded spindle 24. The housing 28' seals and conceals the pinion 27 and gear 28 as well as the outer ends of the shaft 26 and the threaded spindle 24.

Two parts 29 and 30 of a nut 31 are in threaded engagement with the thread 25 of the spindle 24. These parts 29 and 30 are also threaded on the exterior and engage with that external thread an internal thread that is formed on a nut body 32. The body 32 is movable axially of the threaded spindle 24 but is not rotatable. The axial movement of the body 32 is brought about by the threaded engagement of the parts 29 and 30 with the threaded spindle 24, and the parts 29 and 30 are provided with flanges 29a and 30a and a lock nut 35, to guide for axial movement the body 32. The parts 29 and 30 may be threaded towards or from each other in a well-known conventional manner to compensate for play or backlash.

A hollow bore spindle 33 surrounds the threaded spindle 24 and is provided on its exterior with axial grooves or splines 34. Said body 32 is in connection with the bore spindle 33 for tied axial feed movement or immobilization, respectively. Said connection includes a platen 36 that is secured to the body 32 and is connected by anti-friction bearings 37 to the bore spindle 33. The splines 34 serve the purpose to provide for the driving connection with the working parts of the head 14 in the usual convenional manner.

There is provided a mechanism, generally indicated at 38, for releasably clamping the body 32 to immobilize it axially of the spindle 24, and thereby to immobilize axially said bore spindle 33.

The mechanism 38 comprises an eccentric member 39 that eccentrically surrounds a grooved auxilary shaft 40, that is disposed in said tube 18 and said eccentric 39 is disposed in a recess 41 of the body 32. The axis of the auxiliary shaft 40 is parallel to that of said spindles 24 and 33. A C-shaped key 41' slides with its long edge in the key groove 42 of the auxiliary shaft 40 and has two legs 43 that laterally abut against recessed end faces of the eccentric member 39. By this arrangement, the key 41' will be disposed in the groove 42 in all positions of the body 32 and will always be carried along by said eccentric member 39 throughout the axial movements of the body 32.

The inner end of the auxiliary shaft 40 is journalled in a bearing 44, and the outer end in a bore 46 of the bearing 23. The auxiliary shaft 40 protrudes through bores 47 and 48 that are disposed on the lower end of the body 32 adjacent the eccentric 39, and the auxiliary shaft 40 is surrounded therebetween by said eccentric member 39.

On the exterior of the bearing 23, the auxiliary shaft 40 carries a handle 49 that extends to the outside of the machine, and which can be turned about the axis of the auxiliary shaft 40 for turning the latter throughout at least 120°. By said turn of the auxiliary shaft 40, the eccentric member 39, owing to the connection provided by the key 41', will be turned with said auxiliary shaft 40.

The eccentric member 39 is so positioned in the tube 18 that by the turning of the auxiliary shaft 40 for a pre-determined angle, for instance 120°, the eccentric portion of the member 39 will be wedged against the interior surface of the tube 18 to clamp the body 32. The clamping may be carried out in all positions of the body 32 axially of the threaded spindle shaft 24.

Clamping of the body 32 by the eccentric member 39 will result in immobilizing the body 32, without the possibility of accidental release.

The operation of the above described machine and mechanism are as follows.

When the mechanism 38 is released, the body 32 may be propelled axially of the spindle shaft 24, for feeding the bore spinde 33. This propulsion is brought about by the rotation of the shaft 26 driving through the meshing pinion 27 and gear 28 the spindle 24; the parts 29 and 30 engage the thread 25 of the spindle 24 and take along on their axial movement the body 32. Through this axial movement the body 32 will take along the eccentric member 39 which, in turn, takes along the key 41' that slides in the groove 42 of the auxiliary shaft 40.

If it is desired to clamp the body 32 in any position axially of the spindle shaft 24, this can be done by turning the handle 49 about the axis of the auxiliary shaft 40 throughout a pre-determined angle. By such turning, the eccentric member 39 is turned by the key 41' and wedges against the interior of the tube 18 to immobilize releasably the body 32, placing it into frictionable engagement with the interior of the tube 18. This wedging is released by returning the handle 49 to the initial position.

It will be apparent to those skilled in the art that the novel principles of the invention disclosed herein in connection with a specific exemplification thereof will suggest various other modifications and applications of the same. It is accordingly desired that in construing the breadth of the appended claims they shall not be limited to the specific exemplification of the invention described herein.

Having thus described the invention, what I claim as new and desire to be secured by Letters Patent, is as follows:

1. In a horizontal boring machine, in combination, a hollow tube, a threaded spindle, journalled in said tube, a hollow bore spindle surrounding said threaded spindle and being axially movable thereon, a nut body connected to said bore spindle and movably axially therewith, and a mechanism operable for releasably clamping said body in any position axially of said threaded spindle, comprising an auxiliary shaft parallel to said threaded spindle and being rotatable from the exterior, and a wedge member connected to said body and axially movable therewith in said tube throughout all positions thereof and surrounding said auxiliary shaft and slidable relative thereto and rotatable together therewith, and being operable to immobilize said body in said tube.

2. In a horizontal boring machine, as claimed in claim 1, said body having a recess, said wedge member comprising an eccentric disposed in said recess abutting against surfaces of said recess to be guided thereby for movement with said body, said eccentric being slidably keyed to said auxiliary shaft for turning thereby.

3. A mechanism, for use in connection with a horizontal boring machine having a hollow tube journalling a spindle shaft supporting axially movably, a bore spindle concentrically surrounding said spindle shaft, and a nut body axially movable with said bore spindle under propulsion by said spindle shaft, said mechanism comprising in combination an auxiliary shaft parallel to said spindle shaft and being turnable between active and inactive positions, and wedge means operated by said auxiliary shaft to wedge releasably said body against the interior of said tube in said active position.

4. In a mechanism, as claimed in claim 3, said wedge means including an eccentric turnable with said shaft between said body and the interior surface of said tube and being slidable relative to said auxiliary shaft and having an eccentric part wedging against said interior surface of said tube in said active position.

References Cited in the file of this patent

UNITED STATES PATENTS

| | | |
|---|---|---|
| 2,251,015 | Gallimore | July 29, 1941 |
| 2,640,377 | Millholland | June 2, 1953 |